T. AND A. MOHN.
AUTOMOBILE RIM.
APPLICATION FILED JULY 7, 1919.
1,320,404.
Patented Nov. 4, 1919.
2 SHEETS—SHEET 1.
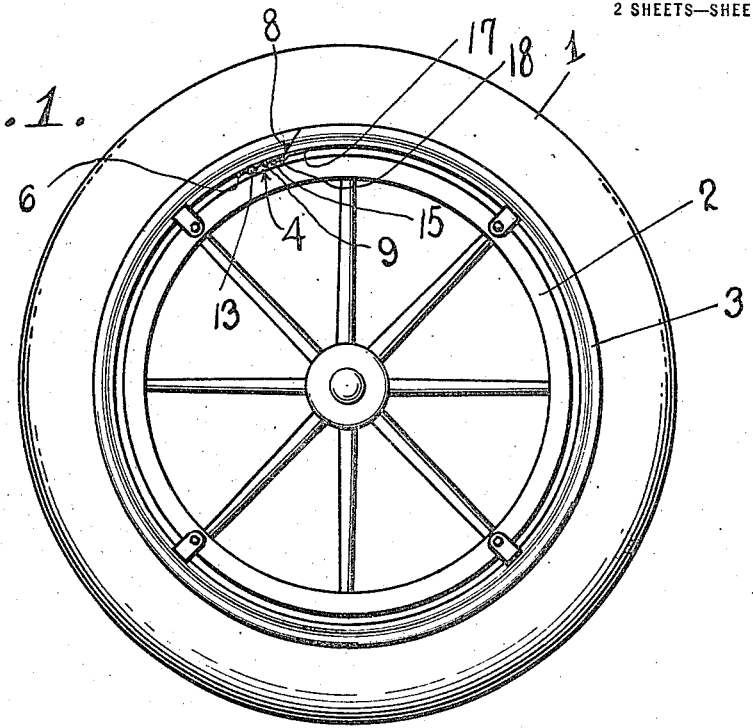
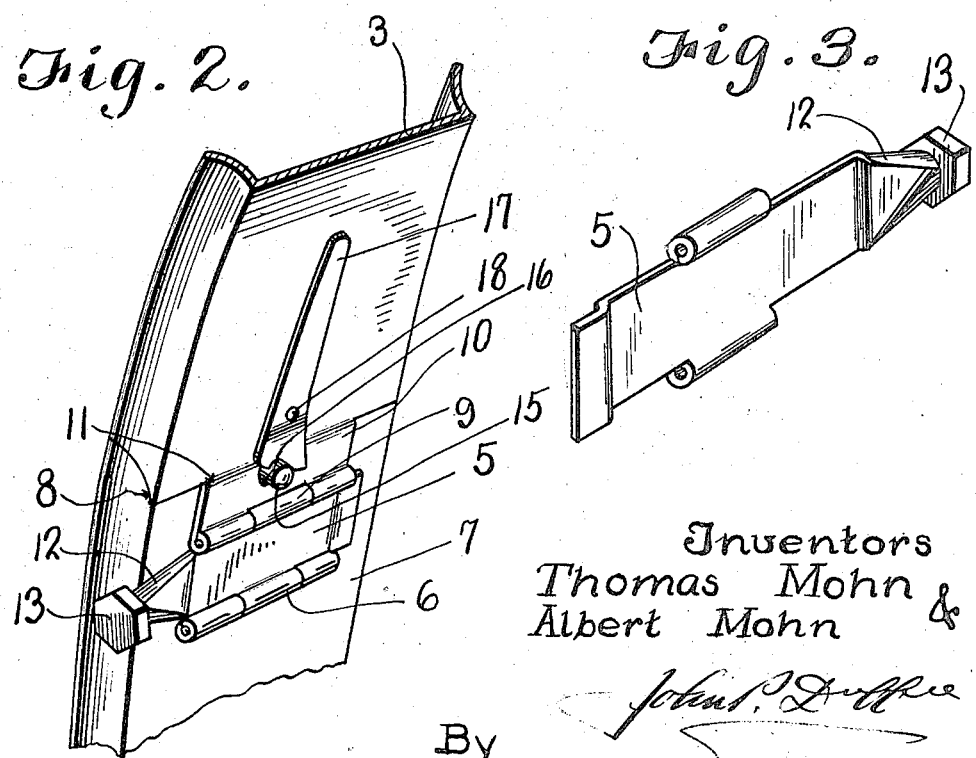
Inventors
Thomas Mohn &
Albert Mohn
By
Attorney

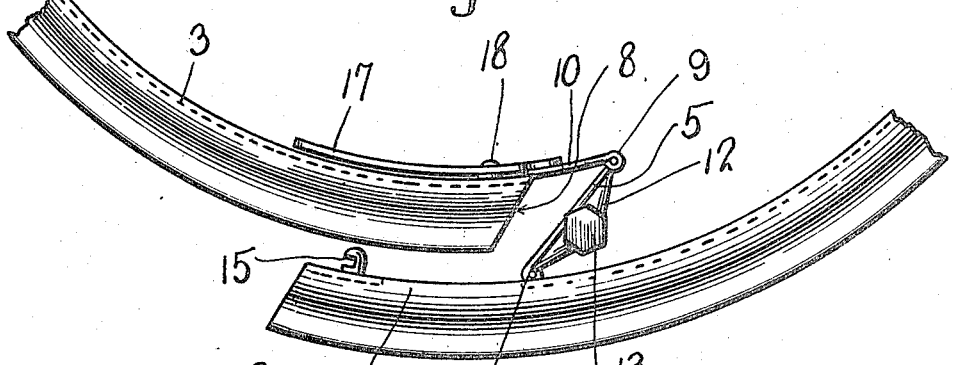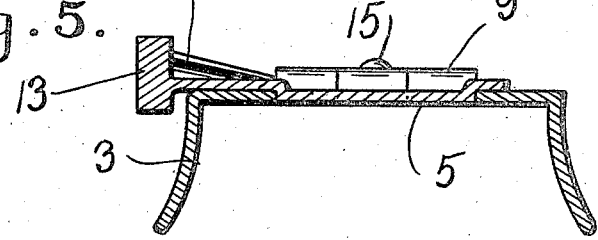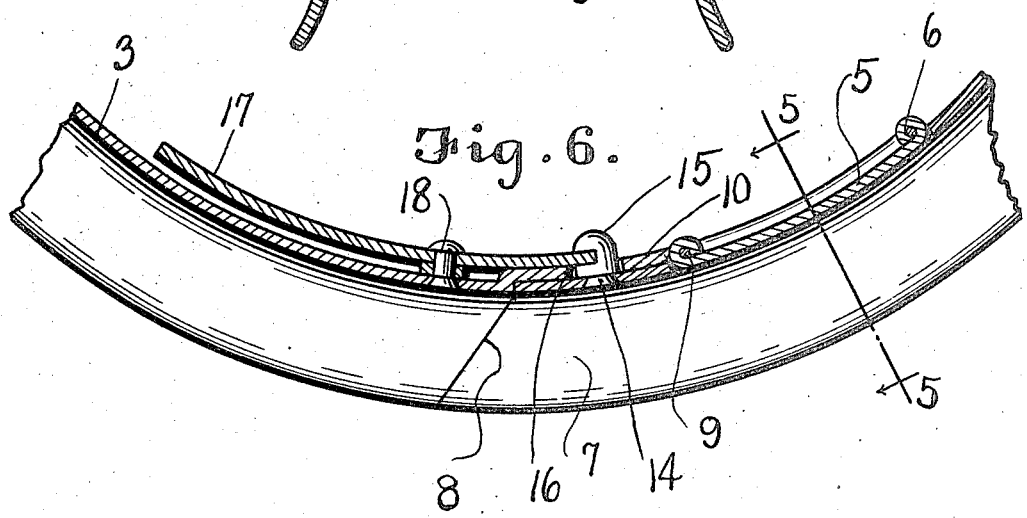

UNITED STATES PATENT OFFICE.

THOMAS MOHN AND ALBERT MOHN, OF RED WING, MINNESOTA.

AUTOMOBILE-RIM.

1,320,404.

Specification of Letters Patent. Patented Nov. 4, 1919.

Application filed July 7, 1919. Serial No. 308,949.

*To all whom it may concern:*

Be it known that we, THOMAS MOHN and ALBERT MOHN, citizens of the United States, residing at Red Wing, in the county of Goodhue and State of Minnesota, have invented certain new and useful Improvements in Automobile-Rims, of which the following is a specification.

This invention relates to new and useful improvements in automobile rims and has for its primary object to provide means for collapsing or contracting the split ends of the rim whereby the tire may be easily and quickly removed and replaced.

With the foregoing and other objects in view that will appear as the nature of the invention is better understood, the same consists in the novel features of construction, combination and arrangement of parts illustrated in the drawings and more particularly pointed out in the appended claims.

In the accompanying drawings, which are for illustrative purposes only and are therefore not drawn to scale,—

Figure 1 is a side elevation of an automobile wheel, illustrating the application of our invention.

Fig. 2 is a detail fragmentary perspective view of the split ends of the rim, illustrating our improved means for contracting the same preparatory to the removal and replacing of the tire on the rim.

Fig. 3 is a detail perspective view of the hinge member.

Fig. 4 is a fragmentary side view, illustrating how the split ends of the rim are contracted or collapsed.

Fig. 5 is a vertical transverse section, taken on the plane indicated by the dotted lines 5—5 of Fig. 6, looking in the direction indicated by the arrows, and Fig. 6 is a longitudinal section, taken through the split ends of the rim and the rim collapsing or contracting means, with the parts in normal or operative position.

Referring to the drawings for a more particular description of the invention and in which drawings like parts are designated by like reference characters throughout the several views, the numeral 1 represents the tire, 2 the felly, 3 a split rim and 4 our improved rim collapsing or contracting means.

As shown, this means comprises a hinge member 5, in the form of a flat oblong strip, which is disposed transversely of the rim and is hingedly connected at one side edge, as 6, to the body portion 7 of the rim, at a point adjacent one end, as 8, thereof. The opposite or outer edge of the hinge member 5, is hingedly connected, as at 9, to a reduced tongue or extension 10, which extends from the opposite end, as 11, of the rim and overlaps the end 8. One end of the hinge member 5 is formed with a longitudinal extension 12, equipped with a fixed hexagonal nut 13, the purpose of which will presently appear.

Projecting inwardly and radially from the body portion 7 of the rim 3, closely adjacent the end 8 thereof, is a catch 14 formed with a recessed head 15 which extends through a corresponding transverse aperture 16 in the tongue 10 when the ends of the rim are in normal position. A locking lever 17 is pivoted near one end, as 18, to the body portion of the rim adjacent the opposite end 11 thereof and is formed with a cam 18, adapted to engage the recessed head 15 of the catch 14 whereby the split ends of the rim are held in normal or operative position.

In practice, to easily and quickly remove the tire for repairs or otherwise, the cam 18 of the locking lever 17 is disengaged with the catch 14, after which operation the nut 13 is engaged by a wrench or other tool convenient for the purpose and the hinge member swung in the arc of a circle to collapse the ends of the rim, as illustrated in Fig. 4. The tire may then be repaired or replaced by a new tire, when the parts are again caused to assume and are locked in normal position.

Attention is invited to the fact that the ends of the rim are split or severed diagonally instead of perpendicularly, to permit the collapsing or contracting of the same.

From the foregoing description taken in connection with the drawings, it is thought that the construction, operation and advantages of this invention will be readily understood without requiring a more extended explanation.

Various changes in the form, proportions and minor details of construction may be resorted to without departing from the principles or sacrificing any of the advantages of this invention as defined in the appended claims.

Having described our invention, what we claim as new and desire to secure by Letters Patent, is:—

1. In combination with the split rim of an automobile or other vehicle wheel, means comprising a hinge member hingedly connected to opposite ends of the rim for collapsing or contracting the same and a stationary polygonal nut at one end of the hinge member adapted to be engaged by a wrench or other tool in turning the latter to contract the rim.

2. In combination with the split rim of an automobile or other vehicle wheel, a hinge member hingedly connected at one edge to the body portion of the rim adjacent one end thereof, a tongue extending from the other or opposite end of the rim and overlapping the first mentioned end thereof, to which the other edge of the hinge member is hingedly connected, a fixed polygonal head or nut formed at one end of the hinge member adapted to be engaged by a wrench or other tool in turning the hinge member to contract or collapse the ends of the rim and means for releasably locking the ends of the rim in normal or operative position.

In testimony whereof we affix our signatures.

THOMAS MOHN.
ALBERT MOHN.